(12) United States Patent
Samie et al.

(10) Patent No.: US 8,201,678 B2
(45) Date of Patent: Jun. 19, 2012

(54) AUTOMATIC TRANSMISSION WITH NORMALLY ENGAGED DISC CLUTCHES

(75) Inventors: Farzad Samie, Franklin, MI (US); Gary L. Jones, Farmington Hills, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 576 days.

(21) Appl. No.: 12/420,993

(22) Filed: Apr. 9, 2009

(65) Prior Publication Data

US 2010/0261574 A1   Oct. 14, 2010

(51) Int. Cl.
*F16D 25/06* (2006.01)

(52) U.S. Cl. .................. 192/85.37; 192/85.45

(58) Field of Classification Search ............... 192/85.37, 192/85.45, 85.46, 91 A, 85.57; 475/146
See application file for complete search history.

(56) References Cited

U.S. PATENT DOCUMENTS

| | | | | |
|---|---|---|---|---|
| 4,440,279 A * | 4/1984 | Schreiner | ............... | 192/30 W |
| 4,775,041 A * | 10/1988 | Boffelli | ............... | 192/70.27 |
| 5,232,411 A * | 8/1993 | Hayashi et al. | ............... | 475/146 |
| 5,511,644 A * | 4/1996 | Murata | ............... | 192/85.38 |
| 5,538,121 A * | 7/1996 | Hering | ............... | 192/70.12 |
| 5,743,369 A * | 4/1998 | Lorriette | ............... | 192/85.49 |
| 5,913,397 A * | 6/1999 | Okada et al. | ............... | 192/85.45 |
| 6,360,623 B1 * | 3/2002 | Matsufuji | ............... | 74/15.66 |
| 6,786,317 B2 * | 9/2004 | Matsufuji et al. | ........ | 192/48.611 |
| 7,036,645 B2 * | 5/2006 | Sowul et al. | ............... | 192/48.91 |

* cited by examiner

*Primary Examiner* — David D Le
*Assistant Examiner* — Lillian Nguyen
(74) *Attorney, Agent, or Firm* — Quinn Law Group, PLLC

(57) ABSTRACT

An automatic variable transmission with normally engaged disc clutches includes a main transmission pump connected to the transmission and at least one clutch located within the transmission. The clutch is in an engaged position when the main transmission pump is not operating. The clutch assembly includes a piston moveable between an engaged position and a disengaged position and at least one spring is operably connected to the piston. The piston is operable to move the at least one spring between the engaged position and a disengaged position. A plurality of clutch plates may transfer torque when the at least one spring is in the engaged position.

5 Claims, 3 Drawing Sheets

AUTOMATIC TRANSMISSION WITH NORMALLY ENGAGED DISC CLUTCHES

TECHNICAL FIELD

The present invention relates generally to a transmission for a vehicle, and more specifically, to a clutch within an automatic transmission of a hybrid electric vehicle.

BACKGROUND OF THE INVENTION

Automotive vehicles with automatic transmissions rely on a main transmission pump to provide fluid pressure to operate clutches internal to the transmission during transmission operation. However, the main transmission pump does not operate when the vehicle engine is stopped. To enhance fuel economy, hybrid vehicles with automatic transmissions stop the engine when the vehicle comes to a stop. Therefore, when a vehicle accelerates from a stop there may be a small delay while pressure builds within the fluid lines before the appropriate transmission clutch may be engaged. To prevent this delay, the vehicle may utilize an auxiliary pump to provide fluid pressure to the transmission clutches during vehicle launch from a stop.

SUMMARY OF THE INVENTION

An automatic transmission with normally engaged disc clutches includes a main transmission pump connected to the transmission and at least one clutch assembly located within the transmission. The clutch assembly is in an engaged position when the main transmission pump is not operating.

The clutch assembly includes a piston moveable between an engaged position and a disengaged position and at least one spring operably connected to the piston. The piston is operable to move the at least one spring between the engaged position and a disengaged position. A plurality of clutch plates transfers torque when the spring is in the engaged position.

A method of operating the clutch assembly includes forcing the plurality of clutch plates into the engaged position with at least one spring, such that the plurality of clutch plates transfer torque from one to another. Then, compressing the at least one spring to release the clutch plates such that the clutch plates move to a disengaged position where the clutch plates may rotate freely from one another. Compressing the spring includes increasing a fluid pressure within the piston of the clutch assembly using the transmission pump and the piston and the spring, in response to the increased fluid pressure within the piston.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
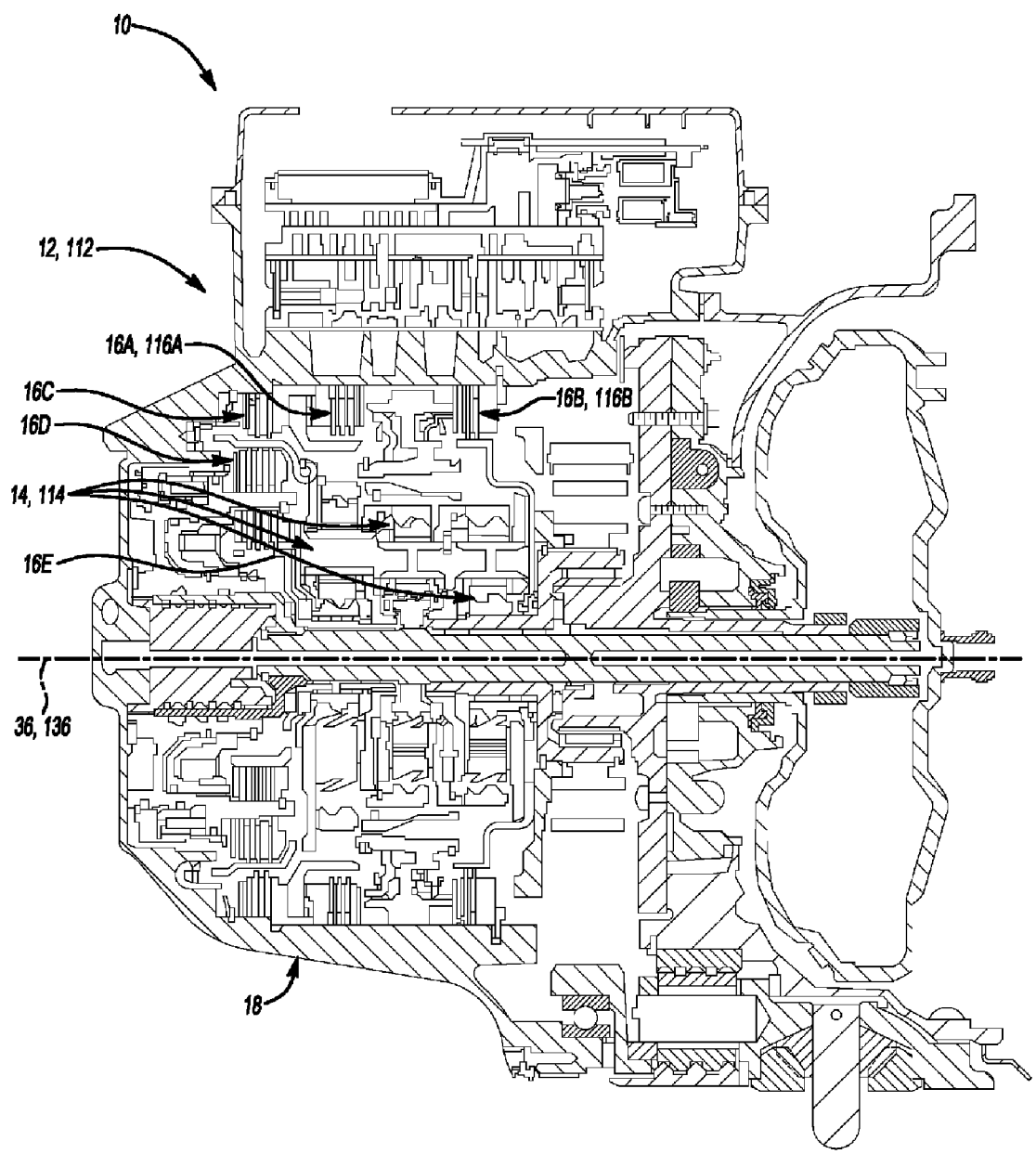
FIG. 1 is a schematic illustration of an automatic transmission with normally engaged disc clutches for a hybrid vehicle.

Referring to the Figures, wherein like reference numbers refer to the same or similar components throughout the several views, FIG. 1 is a schematic view of an exemplary vehicle 10, having an automatic transmission 12. The automatic transmission 12 includes a plurality of planetary gear sets 14. A plurality of clutches 16A-E are located within the transmission 12 to engage and disengage the planetary gear sets 14 from one another and/or from a stationary object, such as a housing 18 of the transmission 12. The number of clutches 16A-E may vary according to the arrangement of the transmission 12 in which they are used. In addition, the transmission 12 may include several types and sizes of clutches 16A-E depending on the function of each specific clutch 16A-E. One skilled in the art would be able to determine the appropriate number, size and type of clutch for a specific transmission.

The transmission 12 includes a first clutch 16A and a second clutch 16B which are normally engaged clutches. That is, the first clutch 16A and the second clutch 16B are in an engaged position when at rest and moved to a disengaged position when force is applied to the clutch 16A, 16B. In the embodiment shown, the first clutch 16A and the second clutch 16B are selected to be normally engaged as the first clutch 16A and the second clutch 16B must be engaged when the transmission 12 operates in first gear or in reverse. When the vehicle 10 is starting after a stop, either first gear or reverse gear will be used. Therefore, the first clutch 16A and the second clutch 16B will be in an engaged position when the vehicle 10 is starting after a stop.

Figure 2:
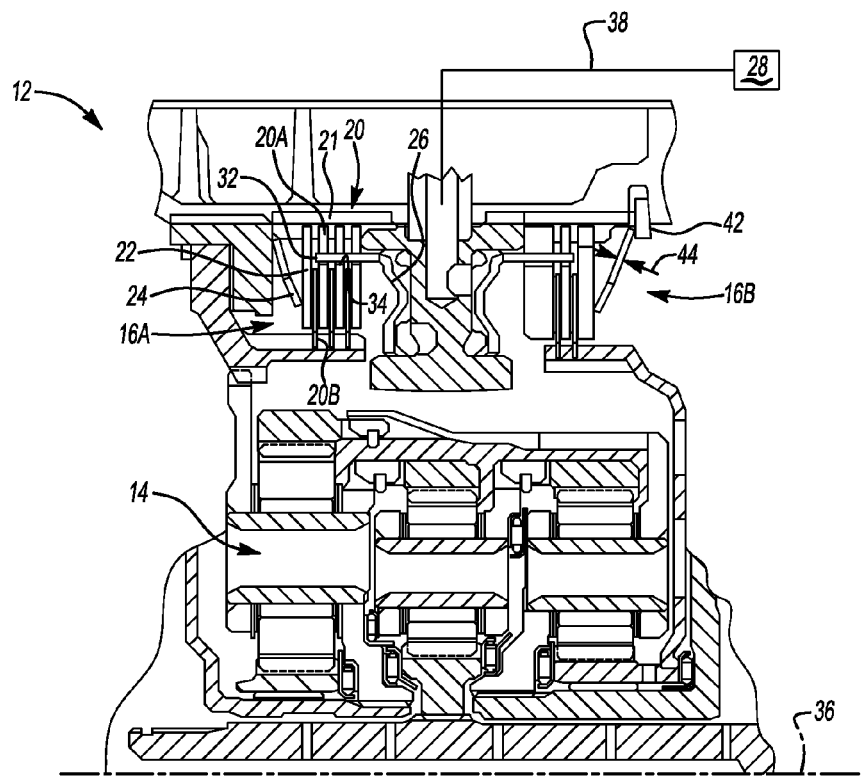
FIG. 2 is an enlarged schematic cross-section of a portion of the automatic transmission of FIG. 1 illustrating a plurality of clutches in an engaged position.

FIG. 2 illustrates an enlarged schematic view of a cross-section for a portion of the transmission 12 showing the first clutch 16A and the second clutch 16B in an engaged position. The operation of the first clutch 16A and the second clutch 16B is made with reference to the first clutch 16A, although both clutches operate in a similar manner. The first clutch 16A includes a plurality of clutch plates 20. The plurality of clutch plates 20 includes at least one stationary clutch plate 20A and at least one rotational clutch plate 20B. The stationary clutch plate 20A is mounted to an object 21 that is stationary, such as a clutch housing. The rotational clutch plate 20B is mounted to an object that may rotate when the clutch is in a disengaged position, such as one of the planetary gear sets 14 of the transmission 12

A backing plate 22 is in contact with the plurality of clutch plates 20. A spring 24 applies force to the backing plate 22 to engage the backing plate 22 with the plurality of clutch plates 20. In the embodiment shown the spring 24 is a Belleville spring. However, other types of springs may also be used.

Figure 3:
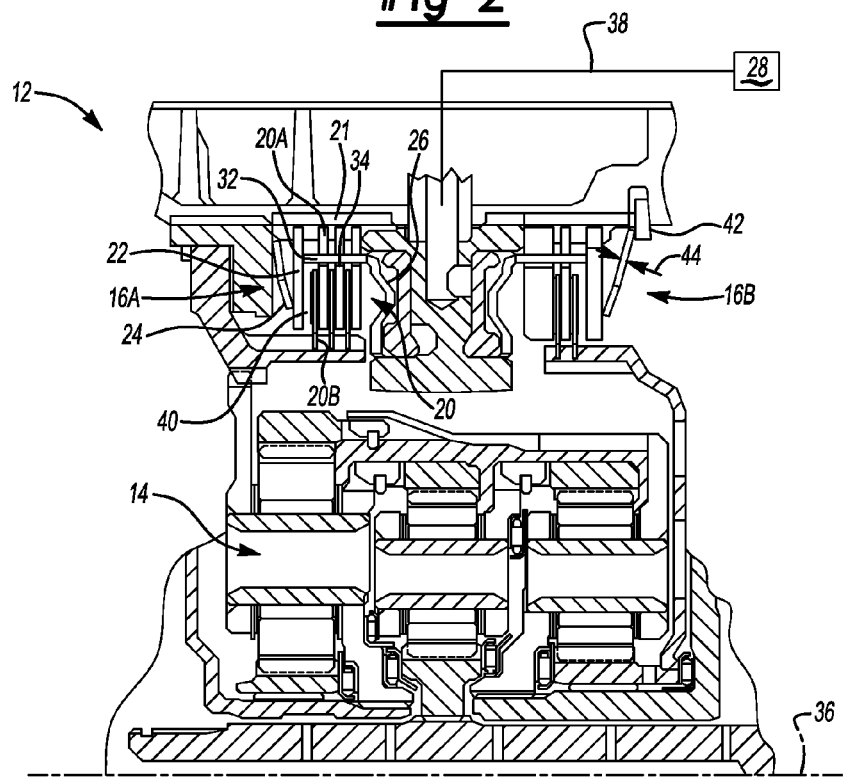
FIG. 3 is an enlarged schematic cross-section of a portion of the automatic transmission of FIGS. 1 and 2 illustrating a plurality of clutches in a disengaged position.

The first clutch 16A has a piston 26 which is fluidly connected to a main transmission pump 28 (shown schematically). The main transmission pump 28 is the pump that provides pressurized fluid for the clutch input, cooling and lubrication. A plurality of fingers 32 extend from the piston 26 to the backing plate 22. The plurality of fingers 32 extend through apertures 34 in some of the clutch plates 20. The fingers 32 are arranged in a concentric ring about an axis 36 of the transmission 12 to evenly apply pressure to the backing plate 22. When a vehicle engine (not shown) is turned on, the main transmission pump 28 is operable. The main transmission pump 28 applies pressure through a fluid line 38 to the piston 26. When the fluid pressure acting on the piston 26 is sufficient to overcome the force applied by the spring 24, the backing plate 22 will move away from the clutch plates 20 to disengage the first clutch 16A. FIG. 3 illustrates the first clutch 16A and the second clutch 16B in a disengaged position.

Referring to FIG. 3, the backing plate 22 is spaced apart from the clutch plates 20 by a gap 40 of sufficient width to prevent torque transfer through the clutch 120. The spring 24 is compressed by the backing plate 22 due to the force applied to the backing plate 22 by the plurality of fingers 32 as a result of fluid pressure acting on the piston 26. When the first clutch 16A must be engaged again the fluid pressure to the corresponding piston 26 is decreased. The force on the backing plate 22 by the spring 24 moves the backing plate 22 into contact with the clutch plates 20 to eliminate the gap 40. A retaining ring 42 is located on an opposing side of the spring 24 from the backing plate 22. The retaining ring 42 secures the spring 24 within the first clutch 16A and is the grounded reaction member for the force imposed by the spring 24.

The spring 24 has a spring thickness 44. The spring thickness 44 determines the amount of force applied to the backing plate 22 by the spring 24 and the amount of force the piston 26 must apply to disengage the first clutch 16A. Therefore, the spring thickness 44 may be determined based upon the fluid pressure which is desired to disengage the clutch 16A for a particular vehicle configuration. One skilled in the art would be able to determine the appropriate fluid pressure and spring thickness 44 for disengagement of the first clutch 16A.

Figure 4:
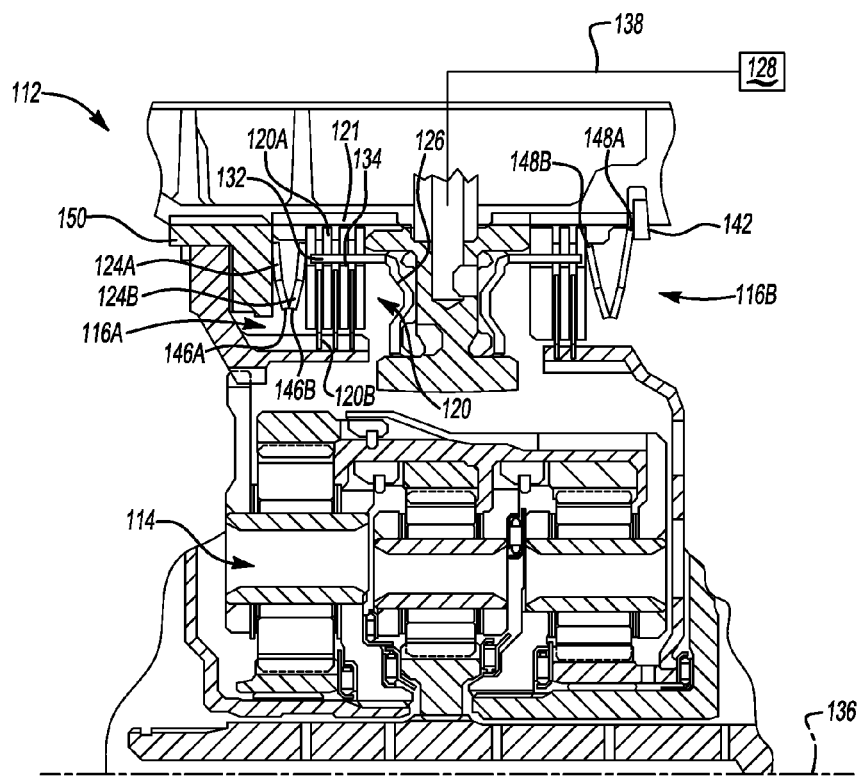
FIG. 4 is an enlarged schematic cross-section of a portion of the automatic transmission of FIG. 1 illustrating another embodiment of a plurality of clutches in an engaged position.

FIG. 4 illustrates an enlarged schematic view of a cross-section of a portion of a transmission 112 illustrating another embodiment of the present invention. The transmission 112 includes a first clutch 116A and a second clutch 116B illustrated in an engaged position. The operation of the first clutch 116A and the second clutch 116B is made with reference to the first clutch 116A, although both clutches operate in a similar manner. The first clutch 116A includes a plurality of clutch plates 120. The plurality of clutch plates 120 includes at least one stationary clutch plate 120A and at least one rotational clutch plate 120B. The stationary clutch plate 120A is mounted to an object 121 that is stationary, such as a clutch housing. The rotational clutch plate 120B is mounted to an object that may rotate when the clutch is in a disengaged position, such as a hub connected to one of the planetary gear sets 114 of the transmission 112

A first spring 124A and a second spring 124B apply force to the clutch plates 120 to engage the plurality of clutch plates 120 with one another. In the embodiment shown the first spring 124A and the second spring 124B are Belleville springs. However, other types of springs may also be used.

The first clutch 116A has a piston 126 which is fluidly connected to a main transmission pump 128 (shown schematically). A plurality of fingers 132 extend from the piston 126 to the second spring 124B. The plurality of fingers 132 extend through apertures 134 in some of the clutch plates 120. The fingers 132 are arranged in a concentric ring about an axis 136 of the transmission 112 to evenly apply pressure to the second spring 124B. The first spring 124A and the second spring 124B are generally annular in shape and each have an inner edge 146A, 146B. The first spring 124A and the second spring 124B are in contact with one another at or near the inner edge 146B of the second spring 124B. The first spring 124A and the second spring 124B also each have an outer edge 148A, 148B. The outer edge 148A of the first spring 124A is in contact with a clutch housing 150 or a retaining ring 142. The plurality of fingers 32 are in contact with the second spring 124B at or near outer edge 148B.

Figure 5:
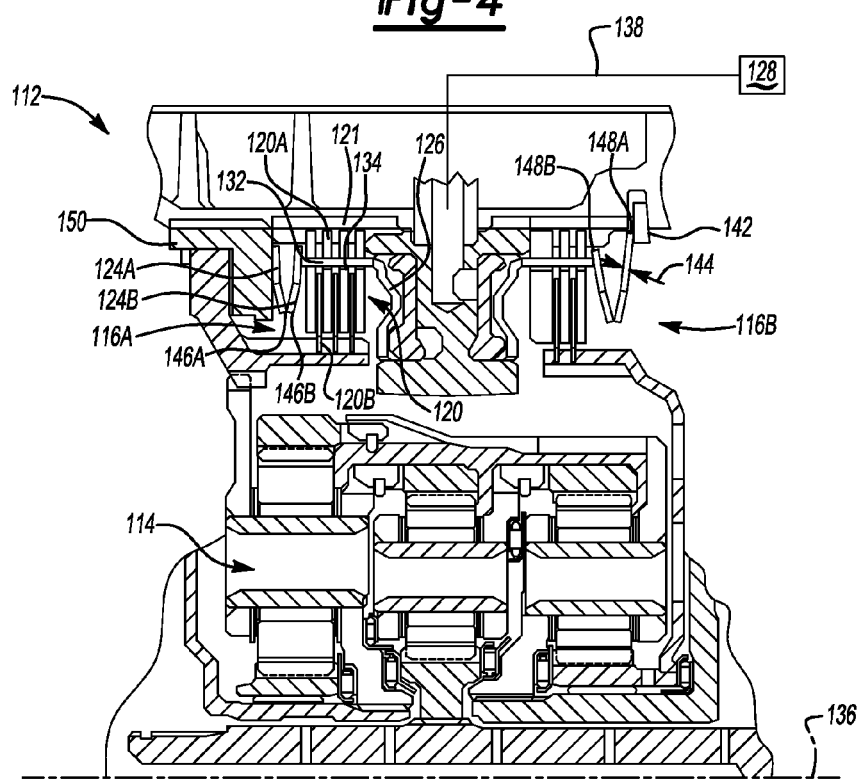
FIG. 5 is an enlarged schematic cross-section of a portion of the automatic transmission of FIGS. 1 and 4 illustrating another embodiment of a plurality of clutches in a disengaged position.

When a vehicle engine (not shown) is turned on, the main transmission pump 128 is operable. The main transmission pump 128 applies pressure through a fluid line 138 to the piston 126. When the fluid pressure acting on the piston 126 is sufficient to overcome the force applied by the first spring 124A and the second spring 124B, the plurality of fingers 132 will compress the first spring 124A and the second spring 124B. This will remove the force the first spring 124A and the second spring 124B apply to the clutch plates 120 and will disengage the first clutch 116A. FIG. 5 illustrates the first clutch 116A and the second clutch 116B in a disengaged position.

Referring to FIG. 5, the first clutch 116A and the second clutch 116B are illustrated in a disengaged position. The first spring 124A and the second spring 124B are compressed by the plurality of fingers 132 as a result of fluid pressure acting on the piston 126. As can be seen, the clutch plates may or may not have a gap located between one another. However, as the first spring 124A and the second spring 124B are not applying force to the clutch plates 120 they may rotate freely and separately from one another and torque will not be transferred through the clutch plates 120.

When the first clutch 116A must be engaged again the fluid pressure to the corresponding piston 126 is decreased. The force on the first spring 124A and the second spring 124B is released and the first spring 124A and the second spring 124B expand to bring the clutch plates 120 into contact with one another. The retaining ring 142 is located on an opposing side of the first spring 124A from the clutch plates 120. The retaining ring 142 secures the first spring 124A and the second spring 124B within the first clutch 116A and is the grounding reaction member for the forces imposed by the first spring 124A and the second spring 124B.

The first spring 124A and the second spring 124B each have a spring thickness 144. The spring thickness 144 is preferably the same or nearly the same for the first spring 124A and the second spring 124B so that the first spring 124A and the second spring 124B both compress a comparable amount to one another. The spring thickness 144 determines the amount of force applied to the clutch plates 120 by the first spring 124A and the second spring 124B and the amount of force the piston 126 must apply to disengage the first clutch 116A. Therefore, the spring thickness 144 may be determined based upon the fluid pressure which is desired to disengage the clutch for a particular vehicle configuration. One skilled in the art would be able to determine the appropriate fluid pressure and spring thickness 144 for disengagement of the first clutch 116A.

While the best modes for carrying out the invention have been described in detail, those familiar with the art to which this invention relates will recognize various alternative designs and embodiments for practicing the invention within the scope of the appended claims.

The invention claimed is:
1. An automatic transmission comprising:
a main transmission pump connected to the transmission; and
at least one clutch assembly located within the transmission, wherein the at least one clutch assembly is configured in an engaged position when the main transmission pump is not operating, and includes:
a plurality of clutch plates configured to transfer torque;

a backing plate in contact with the plurality of clutch plates;

at least one spring configured to apply force to the plurality of clutch plates via the backing plate in a spring engaged position such that the clutch plates transfer the torque; and a piston fluidly connected to the main transmission pump and having a plurality of fingers extending to the backing plate that are configured to move the at least one spring via the backing plate between the spring engaged position and a spring disengaged position.

2. The automatic transmission of claim 1, wherein the at least one spring is a Belleville spring.

3. A method of operating a clutch assembly, the method comprising:

forcing a plurality of clutch plates into an engaged position with at least one spring, such that the plurality of clutch plates may transfer torque from one to another; and compressing the at least one spring to release the clutch plates such that the clutch plates move to a disengaged position wherein the clutch plates may rotate freely from one another;

wherein compressing the at least one spring further includes increasing a fluid pressure applied to a clutch assembly piston having a plurality of fingers and moving a backing plate located between the clutch plates and the at least one spring via the plurality of fingers using a transmission pump to thereby move the piston and compress the at least one spring via the backing plate.

4. The method of claim 3, further comprising:

releasing the at least one spring by decreasing the fluid pressure applied to the piston, such that the clutch plates move to the engaged position.

5. The method of claim 3, wherein the compressing the at least one spring is accomplished in response to the increased fluid pressure on the piston.

* * * * *